US006517248B1

(12) United States Patent
Martin et al.

(10) Patent No.: US 6,517,248 B1
(45) Date of Patent: Feb. 11, 2003

(54) DRIVELINE COMPONENT FOR A MOTOR VEHICLE INCLUDING CORED PASSAGES

(75) Inventors: Berthold Martin, Shelby Township, MI (US); John A. Frait, Clarkston, MI (US); Lawrence G. Newlin, Kokomo, IN (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/282,675

(22) Filed: Mar. 31, 1999

(51) Int. Cl.[7] .............................................. F16C 33/10
(52) U.S. Cl. ....................................................... 384/286
(58) Field of Search ................................ 384/276, 286, 384/287, 322, 372, 377, 380, 392, 397, 462, 473

(56) References Cited

U.S. PATENT DOCUMENTS

| 1,494,099 A | * | 5/1924 | Cole ........................... 384/286 |
| 4,722,240 A | | 2/1988 | Frederick et al. ............. 74/450 |
| 5,645,357 A | * | 7/1997 | Alain .......................... 384/322 |
| 6,120,186 A | * | 9/2000 | Snellman .................... 384/322 |

FOREIGN PATENT DOCUMENTS

JP          56147914      * 11/1981

OTHER PUBLICATIONS

U.S. patent application Ser. No. 09/283,927, Holbrook, filed Apr. 1, 1999.
U.S. patent application Ser. No. 09/282,671, Nassar, filed Mar. 31, 1999.
U.S. patent application Ser. No. 09/283,073, Nogle, filed Mar. 31, 1999.
U.S. patent application Ser. No. 09/283,912, Redinger, filed Apr. 1, 1999.
U.S. patent application Ser. No. 09/282,375, Dourra, filed Mar. 31, 1999.
U.S. patent application Ser. No. 09/281,861, Martin, filed Mar. 31, 1999.
U.S. patent application Ser. No. 09/282,234, Martin, filed Mar. 31, 1999.
U.S. patent application Ser. No. 09/282,376, Nogle, filed Mar. 31, 1999.
U.S. patent application Ser. No. 09/282,383, Collins, filed Mar. 31, 1999.
U.S. patent application Ser. No. 09/282,991, Martin, filed Mar. 31, 1999.
U.S. patent application Ser. No. 09/282,676, Martin, filed Mar. 31, 1999.
U.S. patent application Ser. No. 09/282,988, Martin, filed Mar. 31, 1999.
U.S. patent application Ser. No. 09/282,368, Collins, filed Mar. 31, 1999.
U.S. patent application Ser. No. 09/282,987, Nogle, filed Mar. 31, 1999.
U.S. patent application Ser. No. 09/282,918, Collins, filed Mar. 31, 1999.
U.S. patent application Ser. No. 09/283,911, Holbrook, filed Apr. 1, 1999.

(List continued on next page.)

*Primary Examiner*—Thomas R. Hannon
(74) *Attorney, Agent, or Firm*—Thomas A. Jurecko

(57) ABSTRACT

A reaction shaft support for a motor vehicle transmission includes a fluid passage having a cored portion and a drilled portion. The reaction shaft support includes an axially extending cylindrical portion defining an axially extending cylindrical channel. The reaction shaft support additionally includes a radially oriented face. The fluid passage extending between the front face and the cylindrical channel. The cored portion of the fluid path radially extends from the cylindrical channel. The drilled portion of the fluid path axially extends from the front face to the cored portion.

4 Claims, 4 Drawing Sheets

OTHER PUBLICATIONS

U.S. patent application Ser. No. 09/282,670, Redinger, filed Mar. 31, 1999.
U.S. patent application Ser. No. 09/282,791, Redinger, filed Mar. 31, 1999.
U.S. patent application Ser. No. 09/282,990, Botosan, filed Mar. 31, 1999.
U.S. patent application Ser. No. 09/282,669, Botosan, filed Apr. 1, 1999.
U.S. patent application Ser. No. 09/283,899, Holbrook, filed Apr. 1, 1999.
U.S. patent application Ser. No. 09/283,910, Holbrook, filed Apr. 1, 1999.
U.S. patent application Ser. No. 09/283,454, Holbrook, filed Apr. 1, 1999.
U.S. patent application Ser. No. 09/283,567, Danielson, filed Mar. 31, 1999.
U.S. patent application Ser. No. 09/283,885, Toussagnon, filed Apr. 1, 1999.
U.S. patent application Ser. No. 09/295,713, Nassar, filed Apr. 21, 1999.
U.S. patent application Ser. No. 09/296,022, Nassar, filed Apr. 21, 1999.
U.S. patent application Ser. No. 09/251,258, Botosan, filed Feb. 16, 1999.
U.S. patent application Ser. No. 09/210,977, Correa, filed Dec. 14, 1998.
U.S. patent application Ser. No. 09/168,836, Dourra, filed Oct. 8, 1998.
U.S. patent application Ser. No. 09/277,444, Dourra, filed Mar. 26, 1999.
U.S. patent application Ser. No. 09/273,670, Black, filed Mar. 23, 1999.

* cited by examiner

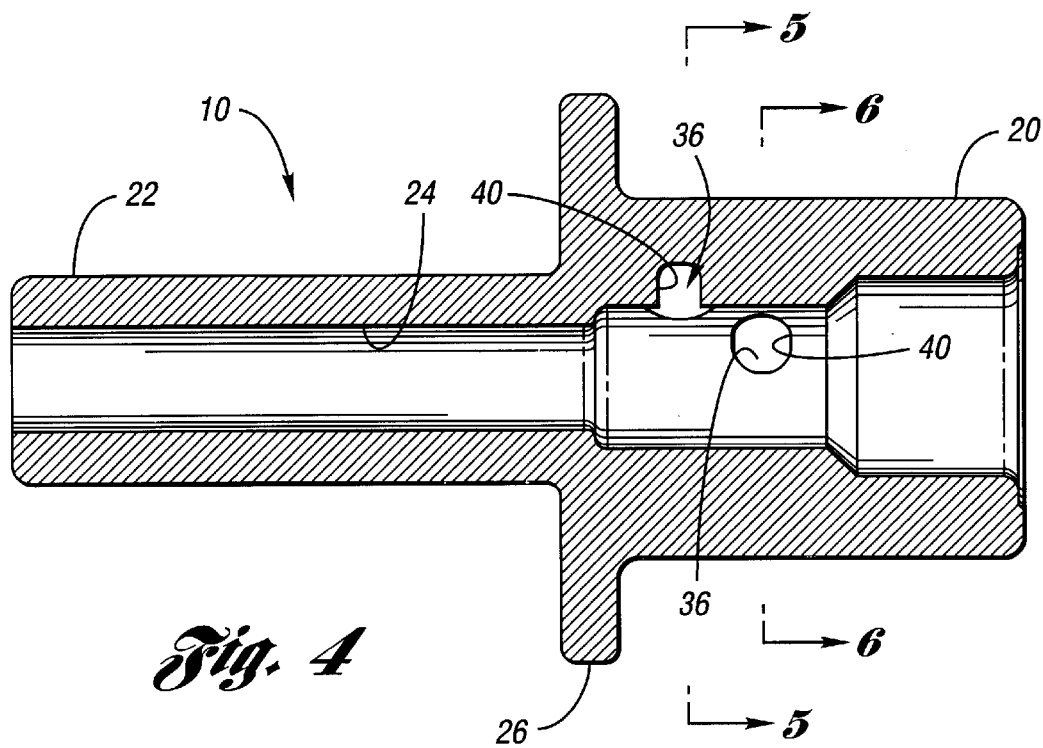
*Fig. 4*
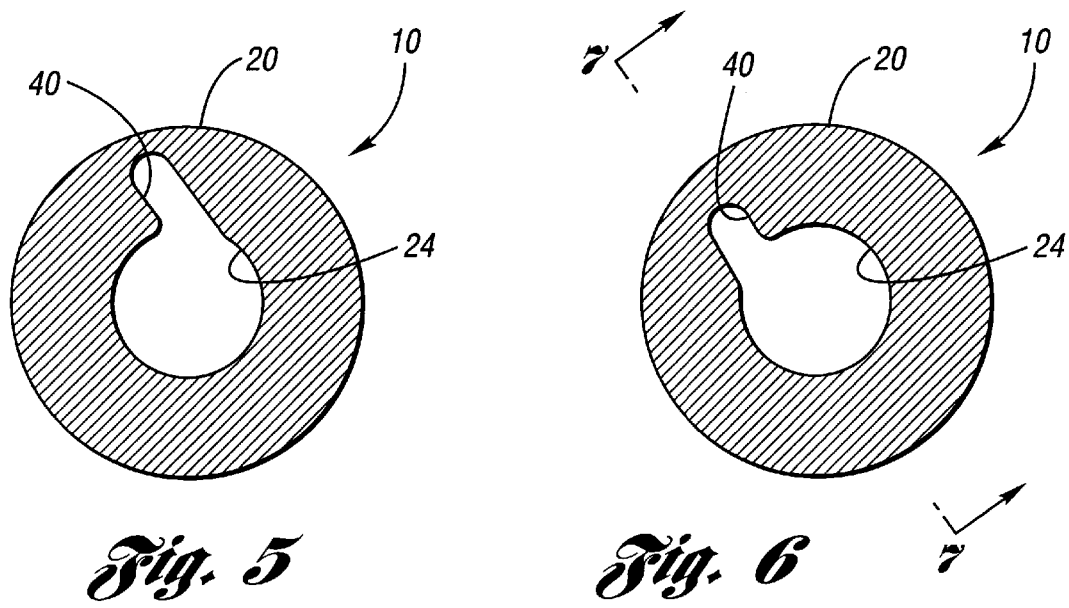
*Fig. 5*  *Fig. 6*

DRIVELINE COMPONENT FOR A MOTOR VEHICLE INCLUDING CORED PASSAGES

BACKGROUND OF THE INVENTION

1. Technical Field

The present invention generally pertains to motor vehicles. More particular, the present invention relates to a driveline component for a motor vehicle including cored passages. More specifically, but without restriction to the particular embodiment and/or use which is shown and described for purposes of illustration, the present invention pertains to a reaction shaft support of a motor vehicle transmission having cored passages and a related method of manufacture.

2. Discussion

The intermeshing metal elements of a driveline unit of a motor vehicle, such as a transmission, transfer case and the like, must be adequately lubricated to avoid undue wear and premature failure. It is well known in the art to provide fluid passages through various elements of a driveline unit to insure sufficient lubrication. The provision of fluid passages may be complicated by particular part geometries.

In its simplest form, a fluid passage for an element of a driveline unit consists of a drilled hole extending perpendicular to a flat surface of the element. Such holes may be easily manufactured with a drill press, for example, without the need for a dedicated manufacturing operation. In situations where such a simple bore will not suffice to provide a fluid passage other, more complicated methods have been heretofore employed. In this regard, multiple manufacturing steps are generally employed for providing sufficient fluid passages in elements of complex shape. For example, where it is desired to provide a fluid passage between a radially extending face and an axially extending channel, a first hole is conventionally drilled radially through the element to intersect the channel. Next, a second hole is axially drilled through the face to intersect the first hole. The outer end of the first hole is subsequently plugged. It has also been proposed to form fluid passages in such elements of complex shape through a single drilled hole extending through the face of the element at an angle intersecting the channel. Such an operation typically requires a dedicated workstation. Furthermore, drilling access for such an angled hole is often restricted.

SUMMARY OF THE INVENTION

It is a general object of the present invention to provide an improved method for constructing a component of a driveline unit of a motor vehicle to include a fluid passage.

It is a more particular object of the present invention to provide a reaction shaft support for a motor vehicle transmission which includes a fluid passage having a radially extending cored portion and an axially extending drilled portion.

In one form, the present invention provides a method of manufacturing a component for a motor vehicle transmission. The method comprises the general step of casting the component to form an axially extending cylindrical portion and a radially oriented face. The cylindrical portion defines an axially extending cylindrical channel and at least one radially extending aperture intersecting the channel. The method further includes the step of forming a generally axially extending aperture cooperating with the radially extending aperture to define a fluid passage between the front face and the cylindrical channel.

In another form, the present invention provides a reaction shaft support for a motor vehicle transmission. The reaction shaft support includes an axially extending cylindrical portion defining an axially extending cylindrical channel. The reaction shaft support additionally includes a radially oriented face. The reaction shaft support further includes at least one fluid passage extending between the front face and the cylindrical channel. The fluid passage includes a cored aperture radially extending from the cylindrical channel and a drilled aperture axially extending from the front face to the cored aperture.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 4 is a cross-sectional view taken along the line 4—4 of FIG. 3.

FIG. 5 is a cross-sectional view taken along the line 5—5 of FIG. 4.

FIG. 6 is a cross-sectional view taken along the line 6—6 of FIG. 4.

DETAILED DESCRIPTION OF THE PREFERRED EMBODIMENT

Figure 1:
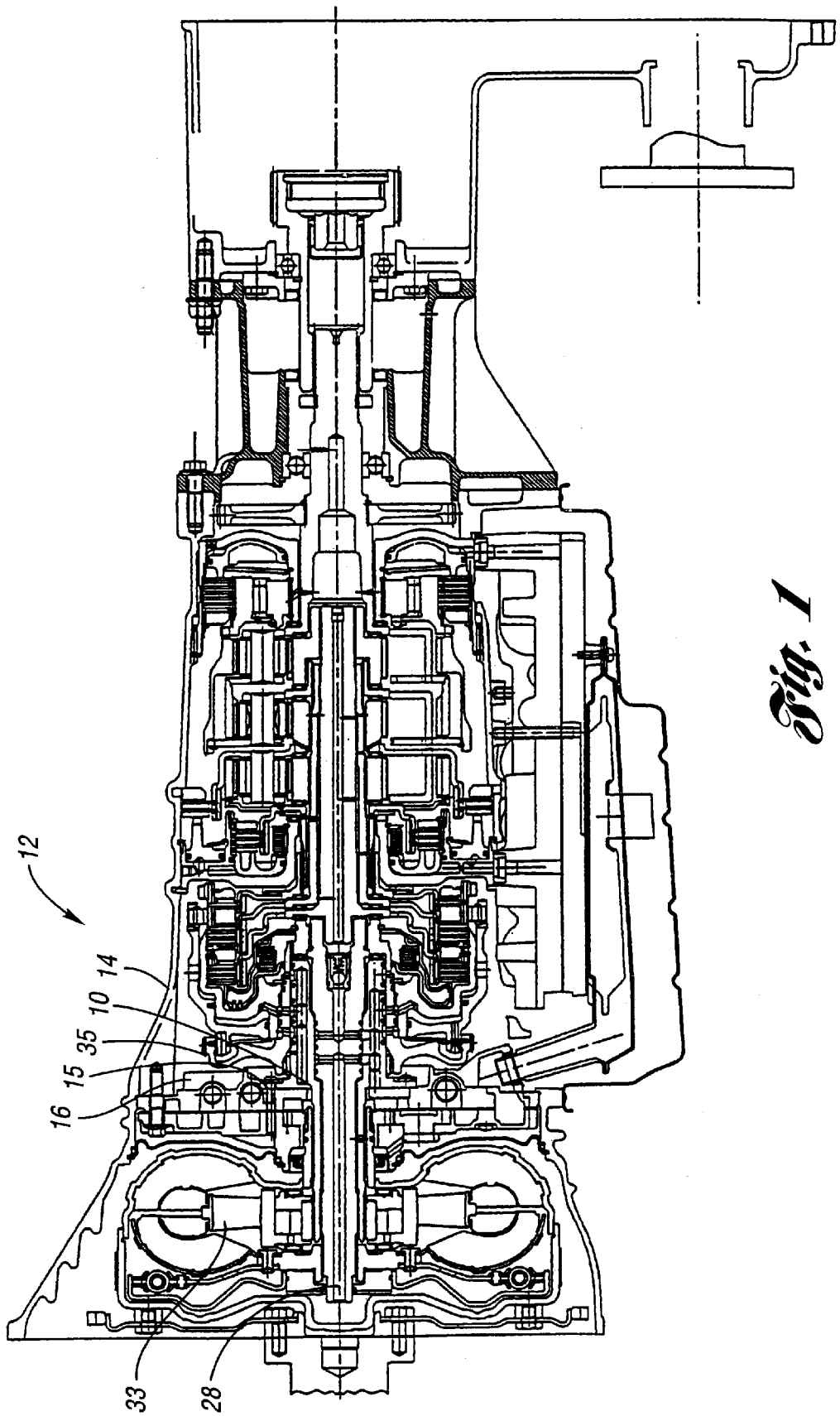
FIG. 1 is a cross-sectional view illustrating a reaction shaft support constructed in accordance with the teachings of a preferred embodiment of the present invention operatively supported within an exemplary transmission for a motor vehicle.
Figure 2:
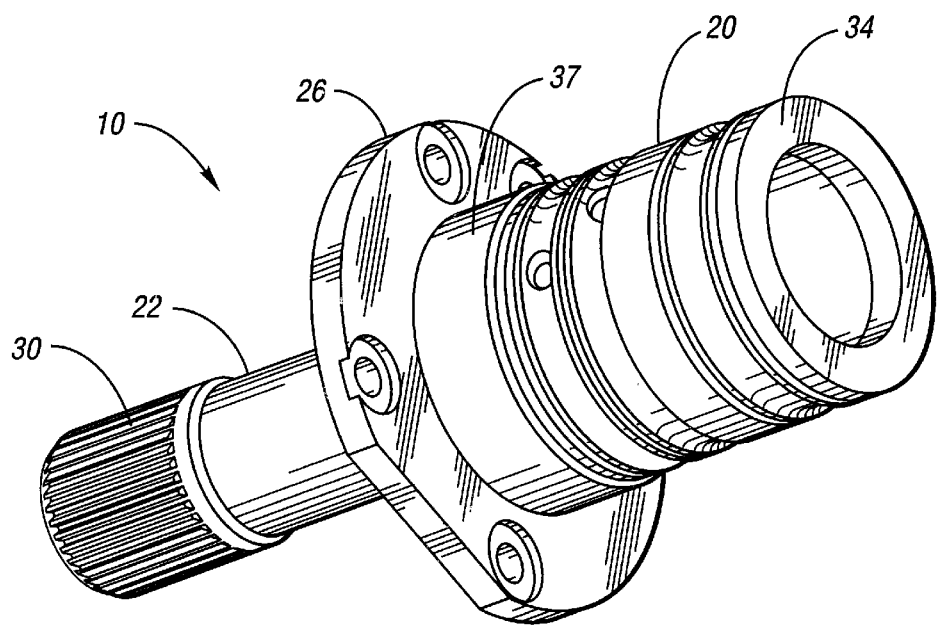
FIG. 2 is a perspective view of the reaction shaft support of the present invention shown removed from the transmission of FIG. 1 for purposes of illustration.
Figure 3:
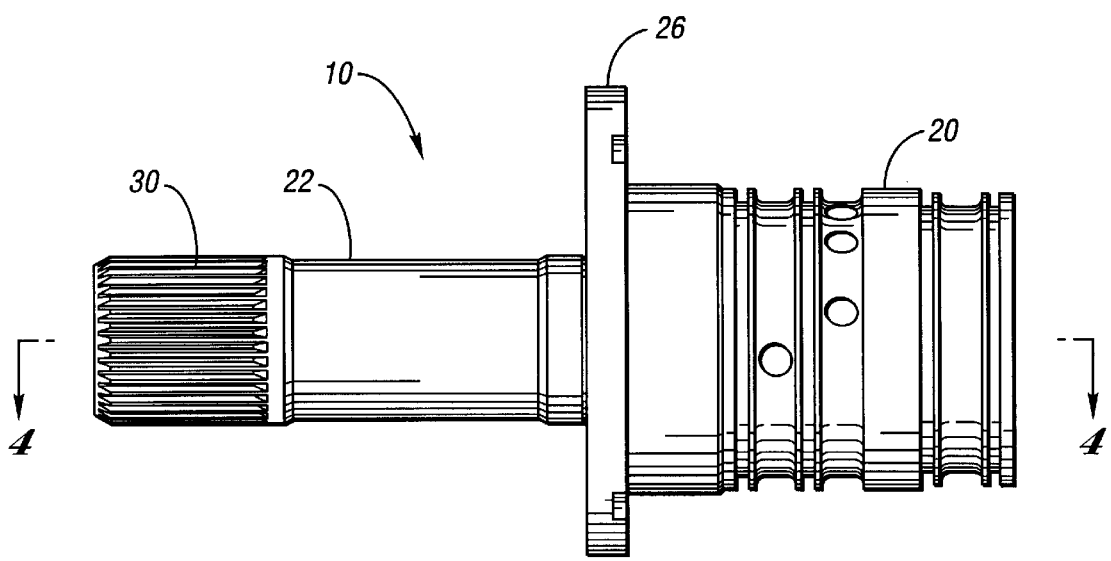
FIG. 3 is a side view of the reaction shaft support of the present invention.
Figure 7:
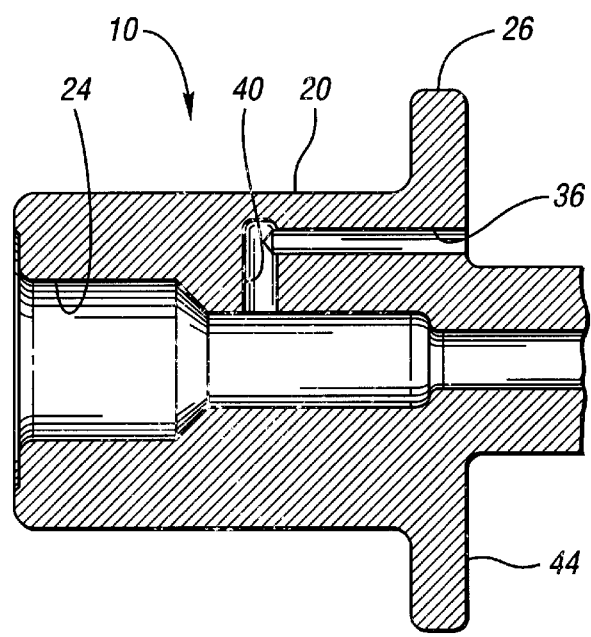
FIG. 7 is a partial cross-sectional view taken along the line 7—7 of FIG. 6.

With initial reference to the cross-sectional view of FIG. 1 of the drawings, a component for a driveline unit of a motor vehicle constructed in accordance with the teachings of a preferred embodiment of the present invention is generally identified at reference numeral 10. In the exemplary embodiment, the component is illustrated as a reaction shaft support 10 operatively incorporated into an automatic transmission 12 of a motor vehicle. It will be understood that the reaction shaft support 10 and the transmission 12 represent one exemplary application at the teachings of the present invention. In this regard, the teachings of the present invention are applicable for various other elements of driveline components.

With continued reference to the cross-sectional view of FIG. 1 and additional reference to FIGS. 2–7, the reaction shaft support 10 is fixedly mounted within a housing 14 of the transmission 12 through a plurality of bolts 15 which secure the reaction shaft support 10 to a pump assembly 16. The reaction shaft support 10 is illustrated to be generally cylindrical in shape including a first cylindrical portion 20 and a second cylindrical portion 22. The first and second cylindrical portions 20 and 22 are hollow and cooperate to define a cylindrical channel 24 axially extending therethrough. As used herein, the term "axial" shall be understood to denote a direction parallel to a longitudinal axis of the reaction support shaft 10. The term "radial" shall be understood to denote a direction perpendicular to the longitudinal axis.

In the embodiment illustrated, the first cylindrical portion 20 has an outer diameter greater than the outer diameter of the second cylindrical portion 22. The reaction shaft support 10 further includes a radially extending mounting flange 26 located between the first and second cylindrical portions 20 and 22. In a conventional manner, the reaction shaft support 10 rotatably supports an input shaft 28. A distal end 30 of the second cylindrical portion 22 is externally splined for coupling to a torque converter assembly 33. The first cylindrical portion 20 supports on its outer surfaces 37 and 34 an input clutch assembly 35.

The reaction shaft support 10 includes at least one fluid path 36 for transmitting fluid from the pump assembly 16 to the generally cylindrical channel 24 for lubricating an interface between the reaction shaft support 10 and the input shaft 28. In the preferred embodiment, the reaction shaft support 10 preferably includes two such fluid paths 36. Each fluid path 36 includes a radially extending aperture or first portion 40 which intersects the central channel 24. In addition, each fluid path 36 includes a second portion 42 which is oriented generally axially and extends from a forward face 44 of the flange portion 26 rearwardly and intersects the first portion 40. In the preferred embodiment, the second portion 42 is oriented perpendicular to the first portion 40. As will be discussed below, the first portions 40 of the fluid paths 36 are cored apertures and the second portions 42 of the fluid paths 36 are drilled apertures. With particular reference to the cross-sectional views of FIGS. 5 and 6, the radially extending portions 40 of the two fluid paths 36 are shown to be angularly offset and parallel to one another.

Figure 8:
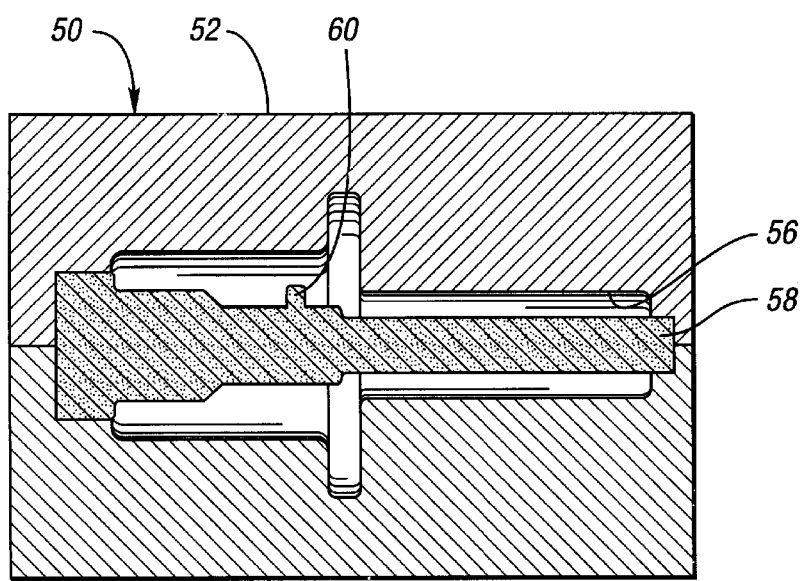
FIG. 8 is a simplified cross-sectional view illustrating a mold and sand core for use with a preferred method of the present invention.
Figure 9:
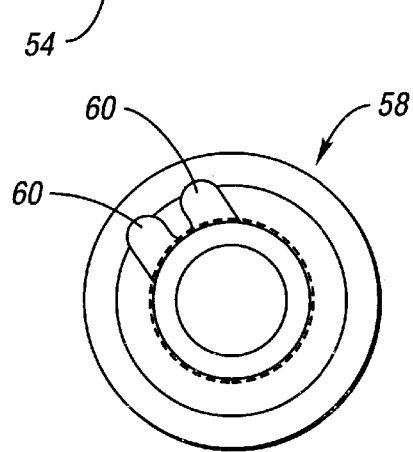
FIG. 9 is an end view of the sand core shown in FIG. 8.

In a preferred method of the present invention, the reaction shaft support 10 is manufactured through a casting operation. The preferred method will be described with continued reference to FIGS. 1–7 and additional reference to FIGS. 8 and 9. In the exemplary embodiment, the present invention utilizes a lost-sand method of casting.

A die 50 is utilized which includes an upper die half 52 and a lower die half 54. The die halves 52 and 54 cooperate to define an internal chamber 56 roughly corresponding in shape to the desired external dimensions of the reaction shaft support 10. A sand core 58 having the general shape of the cylindrical channel 24 of the reaction shaft support 10 is placed between the two die halves 52 and 54. The sand core 58 includes a pair of radially extending portions or nubs 60 sized and oriented to form the radially extending portions 40 of the fluid paths 36. The cavity 56 defined by the die halves 52 and 54 is filled with a molten metal. The molten metal is cooled to form a rough casting of the reaction shaft support 10. The rough casting of the reaction shaft support 10 is removed from the mold 50 and the sand core 58 is removed from the casting in a known manner. The axially extending portions 42 of the fluid paths 36 are now drilled into the casting for the reaction shaft support 10 to thereby complete the fluid paths 36.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A reaction shaft support for a motor vehicle transmission, the reaction shaft support comprising:

an axially extending cylindrical portion defining an axially extending cylindrical channel;

a radially oriented face outwardly extending from said axially extending cylindrical portion; and at least one fluid passage extending between said front face and said cylindrical channel, each fluid passage of said at least one fluid passage including a cored aperture radially extending from said cylindrical channel and a drilled aperture axial extending from said front face to said cored aperture.

2. The reaction shaft support for a motor vehicle transmission of claim 1, wherein said at least one fluid passage comprises first and second fluid passages.

3. The reaction shaft support for a motor vehicle transmission of claim 2, wherein said cored apertures of said first and second fluid passages are radially offset from one another.

4. The reaction shaft support for a motor vehicle transmission of claim 2, wherein said cored passages of said first and second fluid passages extend generally parallel to one another.

* * * * *